(12) United States Patent
Parker et al.

(10) Patent No.: US 10,906,655 B2
(45) Date of Patent: Feb. 2, 2021

(54) UNDER-INSTRUMENT PANEL EMERGENCY VISION APPARATUS

(71) Applicants: Jonathan MacDonald Parker, Vernon, NJ (US); Christian Werjefelt, Kaneohe, HI (US)

(72) Inventors: Jonathan MacDonald Parker, Vernon, NJ (US); Christian Werjefelt, Kaneohe, HI (US)

( * ) Notice: Subject to any disclaimer, the term of this patent is extended or adjusted under 35 U.S.C. 154(b) by 351 days.

(21) Appl. No.: 16/140,139

(22) Filed: Sep. 24, 2018

(65) Prior Publication Data

US 2019/0106219 A1    Apr. 11, 2019

Related U.S. Application Data

(60) Provisional application No. 62/568,515, filed on Oct. 5, 2017.

(51) Int. Cl.
*B64D 25/00* (2006.01)
*B64D 43/00* (2006.01)
*B64D 45/00* (2006.01)

(52) U.S. Cl.
CPC ............. *B64D 25/00* (2013.01); *B64D 43/00* (2013.01); *B64D 2045/009* (2013.01)

(58) Field of Classification Search
CPC ... B64D 25/00; B64D 43/00; B64D 2045/009
See application file for complete search history.

(56) References Cited

U.S. PATENT DOCUMENTS

| | | | | |
|---|---|---|---|---|
| 5,947,415 A | * | 9/1999 | Werjefelt | A62B 99/00 244/118.5 |
| 6,082,673 A | | 7/2000 | Werjefelt | |
| 8,888,042 B2 | | 11/2014 | Werjefelt | |
| 2011/0019297 A1 | * | 1/2011 | Werjefelt | G02B 23/20 359/894 |

(Continued)

OTHER PUBLICATIONS

ISA/US, International Search Report and Written Opinion of the International Searching Authority, PCT/US18/52467, dated Dec. 7, 2018.

*Primary Examiner* — Richard G Davis
(74) *Attorney, Agent, or Firm* — Shlesinger, Arkwright & Garvey LLP

(57) ABSTRACT

An emergency vision apparatus includes a housing for attachment underneath an instrument panel in a cockpit, the housing including a front opening, a front cover for the front opening, a bottom portion of the front cover being pivotably attached to the housing to allow the front cover to open and rotate downwardly; an inflatable enclosure made of airtight material and having an expanded form when deployed and a deflated form when not in use, the enclosure when in the deflated form is stored within the housing; first and second clear members disposed at respective first and second ends of the enclosure to enable a user to see through the enclosure when expanded and observe a source of visual information at a distal end of the enclosure while smoke or other particulate matter is in the environment; a first switch operably associated with the blower to activate the blower and thereby inflate the enclosure to the expanded form when the enclosure is to be deployed; and a tubular air passageway connecting the blower and the enclosure.

22 Claims, 4 Drawing Sheets

(56) References Cited

U.S. PATENT DOCUMENTS

2013/0308260 A1* 11/2013 Stevenson .............. B64D 25/00
 361/679.3
2019/0061949 A1* 2/2019 Potet ...................... A62B 18/02

* cited by examiner

UNDER-INSTRUMENT PANEL EMERGENCY VISION APPARATUS

RELATED APPLICATION

This is a nonprovisional application, claiming the priority benefit of Provisional Application Ser. No. 62/568,515, filed Oct. 5, 2017, herein incorporated by reference.

FIELD OF THE INVENTION

The present invention relates generally to an apparatus to enable an operator to maintain visual contact with instruments or other visual sources of data after smoke and/or particulate from a fire or other sources has invaded the operator's environment. In particular, the present invention relates to a housing for an emergency vision apparatus that can be installed underneath the instrument panel of a cockpit for quick deployment of the inflatable enclosure of the emergency vision apparatus when needed to bridge the gap between a pilot and the windshield and/or instrument panel of an aircraft along the pilot's line of sight and provide a clear viewing path to the windshield and/or the instrument panel, thereby providing the pilot with vital information for guiding the aircraft to a safe landing after smoke and/or particulate matter invades the cockpit area.

BACKGROUND OF THE INVENTION

Emergency vision devices for aiding pilots to see through vision-impairing smoke to maintain their visual access to critical information, such as that provided by an instrument panel and visual information available outside the cockpit to help pilots safely guide their aircrafts are disclosed in U.S. Pat. Nos. 4,832,287; 5,318,250; 5,202,796; 5,947,415; 6,460,804 and 7,583,455 all issued to Bertil Werjefelt.

SUMMARY OF THE INVENTION

The present invention provides an emergency vision apparatus, comprising a housing for attachment underneath an instrument panel in a cockpit, the housing including a front opening, a front cover for the front opening, a bottom portion of the front cover being pivotably attached to the housing to allow the front cover to open and rotate downwardly; a blower within the housing; an inflatable enclosure made of airtight material and having an expanded form when deployed and a deflated form when not in use, the enclosure when in the deflated form is stored within the housing; first and second clear members disposed at respective first and second ends of the enclosure to enable a user to see through the enclosure when expanded and observe a source of information at a distal end of the enclosure while smoke or other particulate matter is in the environment; a first switch operably associated with the blower to activate the blower and thereby inflate the enclosure to the expanded form when the enclosure is to be deployed; and a tubular air passageway connecting the blower and the enclosure.

The present invention also provides An emergency vision apparatus, comprising a housing for attachment underneath an instrument panel in a cockpit, the housing including a bottom opening and a front opening, a bottom cover for the bottom opening, a front cover for the front opening, a rear portion of the bottom cover being pivotably attached to the housing to allow the bottom cover to open and rotate downwardly; a blower within the housing; an inflatable enclosure made of airtight material and having an expanded form when deployed and a deflated form when not in use, the enclosure when in the deflated form is stored within the housing; first and second clear members disposed at respective first and second ends of the enclosure to enable a user to see through the enclosure when expanded and observe a visual source of information at a distal end of the enclosure while smoke or other particulate matter is in the environment; a first switch operably associated with the blower to activate the blower and thereby inflate the enclosure to the expanded form when the enclosure is to be deployed; and a tubular air passageway connecting the blower and the enclosure.

DETAILED DESCRIPTION OF THE INVENTION

Figure 1:
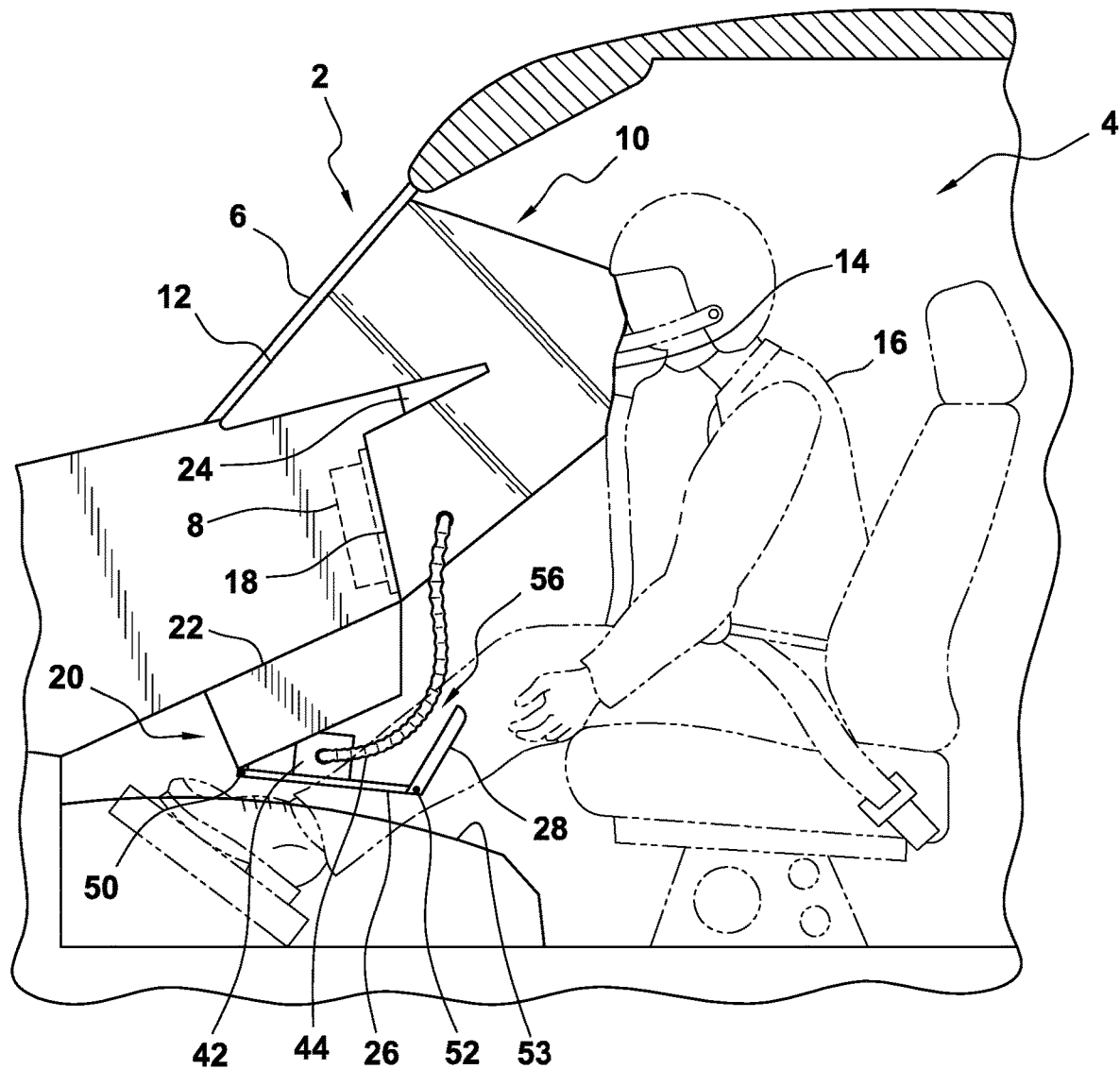
FIG. 1 is a schematic side elevational view of an emergency vision apparatus embodying the present invention in a deployed position inside a cockpit during a smoke emergency.

Referring to FIG. 1, an emergency vision apparatus 2 is disclosed. The apparatus 2 is used in an operator station 4, such as an aircraft cockpit, during a smoke emergency to allow the user to see through the smoke to a source of information, such as the outside through the windshield or flight instruments. In the environment of an aircraft cockpit, the operator station 4 includes a windshield 6 and an instrument panel 8.

The apparatus 2 includes an inflatable enclosure 10 having a transparent, clear member 12 and another transparent, clear member 14 that allow the user 16 to see through the enclosure 10 and out through the windshield 6 during a smoke emergency situation. This advantageously helps the user in trying to control the aircraft and bring it to a safe landing. The enclosure 10 also includes another transparent, clear member 18 to allow the user to observe information on the instrument panel 8.

The apparatus 2 includes a housing 20, preferably attached to structural members 22 (see FIG. 3) of the cockpit below the instrument panel 8. The placement of the housing 20 advantageously allows for convenient deployment of the enclosure 10 to the windshield 6 and the instrument panel 8. The glare shield 24 provides support to the enclosure 10 while deployed. The housing 20 may also be placed elsewhere in the cockpit for easy reach by the user, such on the side wall 23 (see FIG. 2) of the cockpit.

The enclosure 10 may be made in any shape as long as there is a clear line of sight between the clear members 12 and 14, and between the clear members 18 and 14. Preferably, the clear member 12 will be oriented and shaped to provide close contact with the windshield 6 so as to displace vision-obscuring smoke in the space in between. Similarly, the clear member 18 will be oriented in close contact with the face of the instrument panel 8. The clear members 12, 14 and 18 are pliable enough to conform to and seal over irregularities on the surfaces which they contact to displace any smoke on such surfaces.

The enclosure 10 is made of airtight fabric or other pliable and foldable material, such as plastic sheet, which may be translucent or transparent to provide light to enter the interior of the enclosure 10 and provide some level of illumination. The transparent, clear members 12, 14 and 18 may be made of foldable sheet plastic.

The housing 20 has a bottom cover 26 and a front cover 28, shown in the open position in FIG. 1. The housing 20 is preferably a box-like structure, narrow and long to advantageously minimize taking away from the user's leg room.

Figure 2:
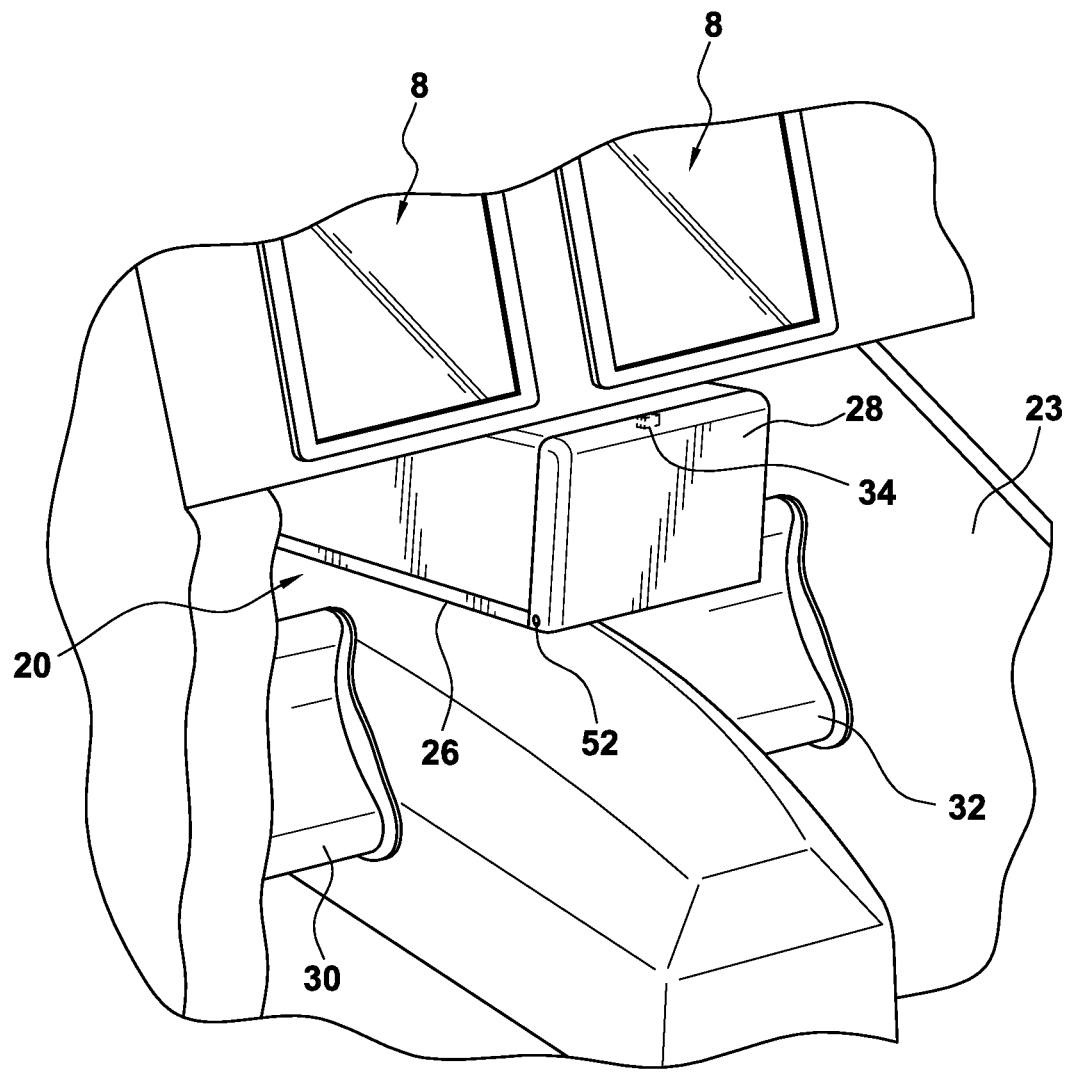
FIG. 2 is a perspective view of a housing of the apparatus of FIG. 1 in a closed position.

Referring to FIG. 2, the housing 20 is shown in the closed position. The housing 20 is advantageously disposed underneath the instrument panel 8 and between the left pedal 30 and the right pedal 32, advantageously out of way of the user. The front cover 28 is advantageously placed in front of the user, below the instrument panel 8, for almost constant visibility to the user in case the apparatus 2 is needed in an emergency. The cover 28 includes a latch 34 that allows opening of the cover 28 upon a pulling pressure from the user. Other types of securing the cover 28, such as a magnetic holder, may be used. The cover 28 is within easy reach of the user in case of an emergency.

Figure 3:
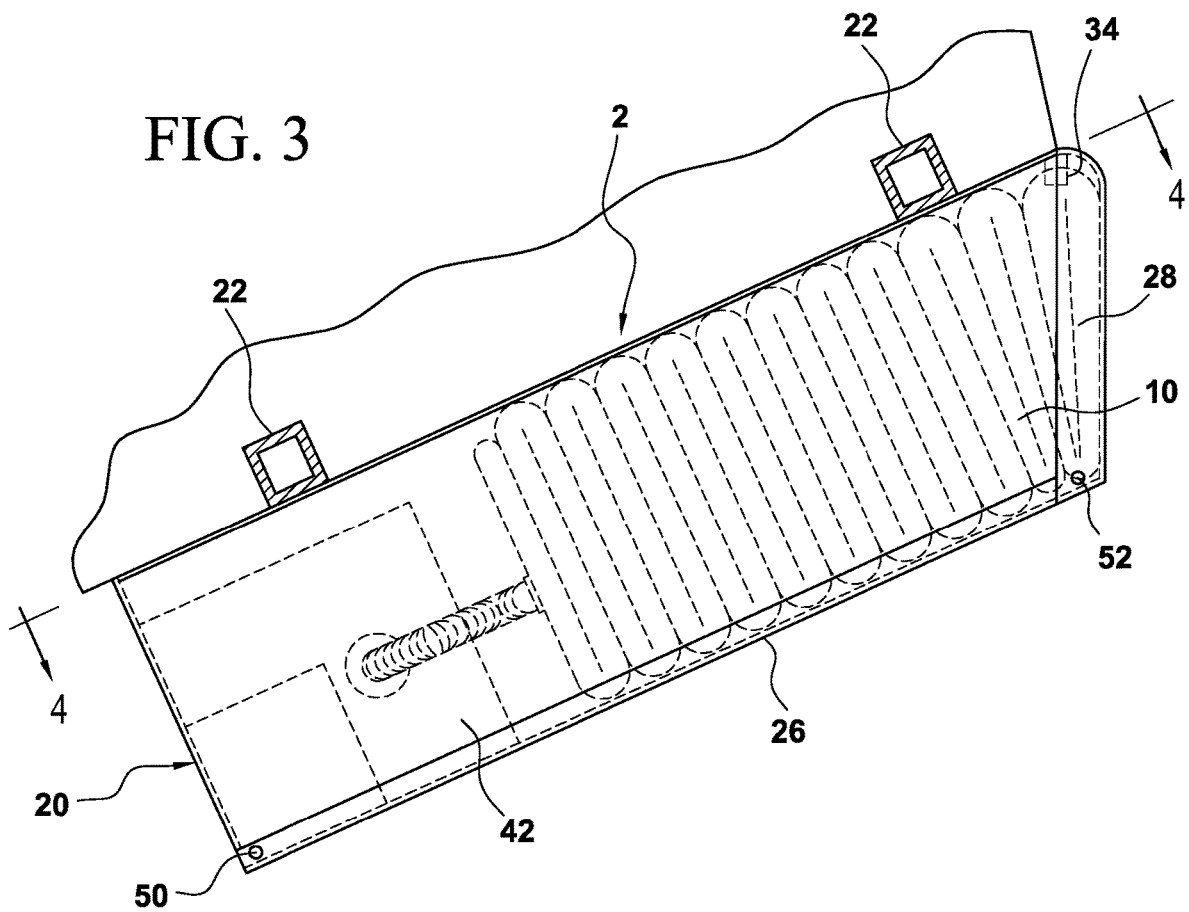
FIG. 3 is a side elevational view of housing shown in FIG. 2, showing the components of the apparatus in a stored position.
Figure 4:
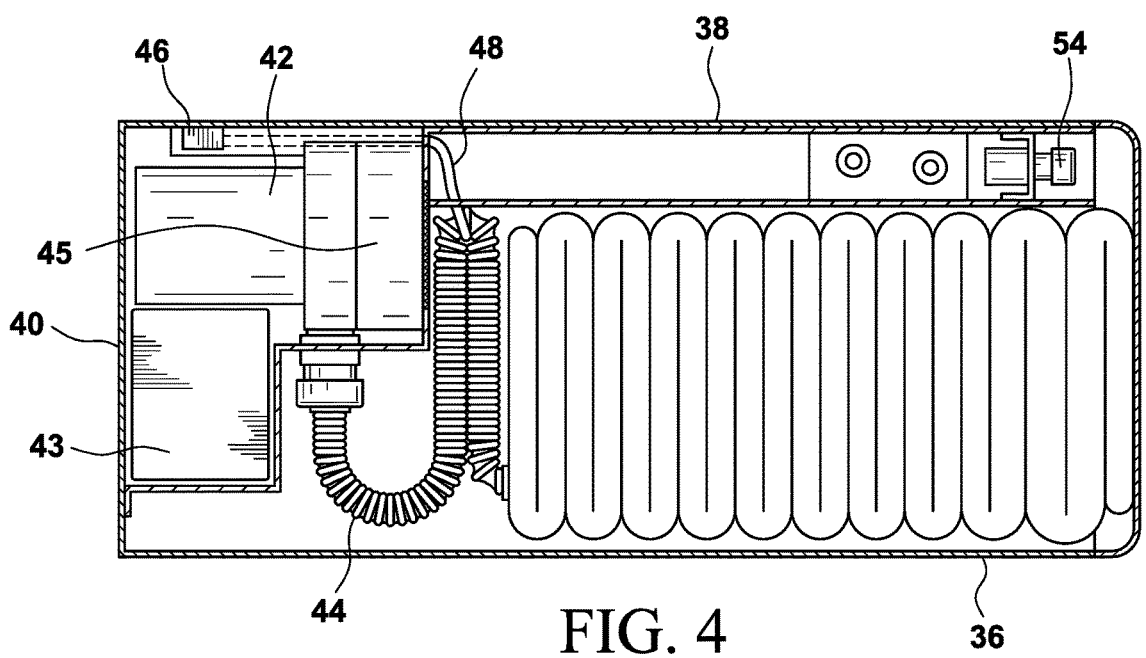
FIG. 4 is a cross-sectional view taken along line 4-4 in FIG. 3.

Referring to FIGS. 3 and 4, the housing 20 has left-side wall 36 and right-side wall 38, and back wall 40. The enclosure 10 when deflated is disposed inside the housing 20. A blower 42 and a battery 43 are disposed inside the housing 20. A filter 45 is effective to filter the particulate matter in the smoke so that clear air is pumped into the interior of the enclosure 10. A hose 44 connects the blower 42 to the enclosure 10. A switch 46 turns the blower 42. A removable member 48 is operably associated with the switch 46 such that removal of the member 48 away from the switch 46 is effective to activate the blower 42. The removable member 48 is tied to the hose 44. When the enclosure 10 is taken out of the housing 20 for deployment in an emergency, the removable member 48 is pulled away by the hose 44 from the switch 46. The folded enclosure 10 is advantageously compressed and preferably presses against the front cover 28 so that when the front cover 28 is opened, the folded enclosure 10 pushes outwardly against the front cover 28 to be immediately visible to the user 16 in the opening 56 (see FIG. 5) for deployment.

A hinge or pivot 50 attaches the bottom cover 26 to a rear portion the housing 20. The pivot 50 has preferably limited range of motion of about less than 90° so that the cover 26 can only open and rotate downwardly a limited distance to advantageously keep the folded enclosure 10 within easy reach by the user 16 for deployment. Alternatively, the pivot 50 can allow the cover 26 to rotate freely into the open position to rest on a structure 53 below.

A hinge or pivot 52 attaches the front cover 28 to the front portion of the bottom cover 26. The pivot 52 has preferably limited range of motion of about 90° so that the cover 28 can only open and rotate a limited distance toward the user. The cover 26 in the limited open position advantageously serves to contain the folded enclosure 10 within the housing 20 so as to be within easy reach of the user 16 during deployment.

The blower 42, the battery 43, the hose 44 and the enclosure 10 are preferably disposed on the bottom cover 26 to advantageously provide additional weight to aid in the relatively quick opening of the bottom cover 26 during deployment.

A switch 54 is effective to reverse the rotation of the blower 42 such that the air inside the enclosure 10 is advantageously vacuumed out to deflate the enclosure 10 when the emergency situation has ended. The larger opening 56 (see FIGS. 1 and 5) afforded by the bottom cover 26 and the front cover 28 when in the open position advantageously allows the user to push back the deflated enclosure 10 into the housing 20. The switch 54 may also be configured to turn off the blower after the emergency has ended.

Figure 5:
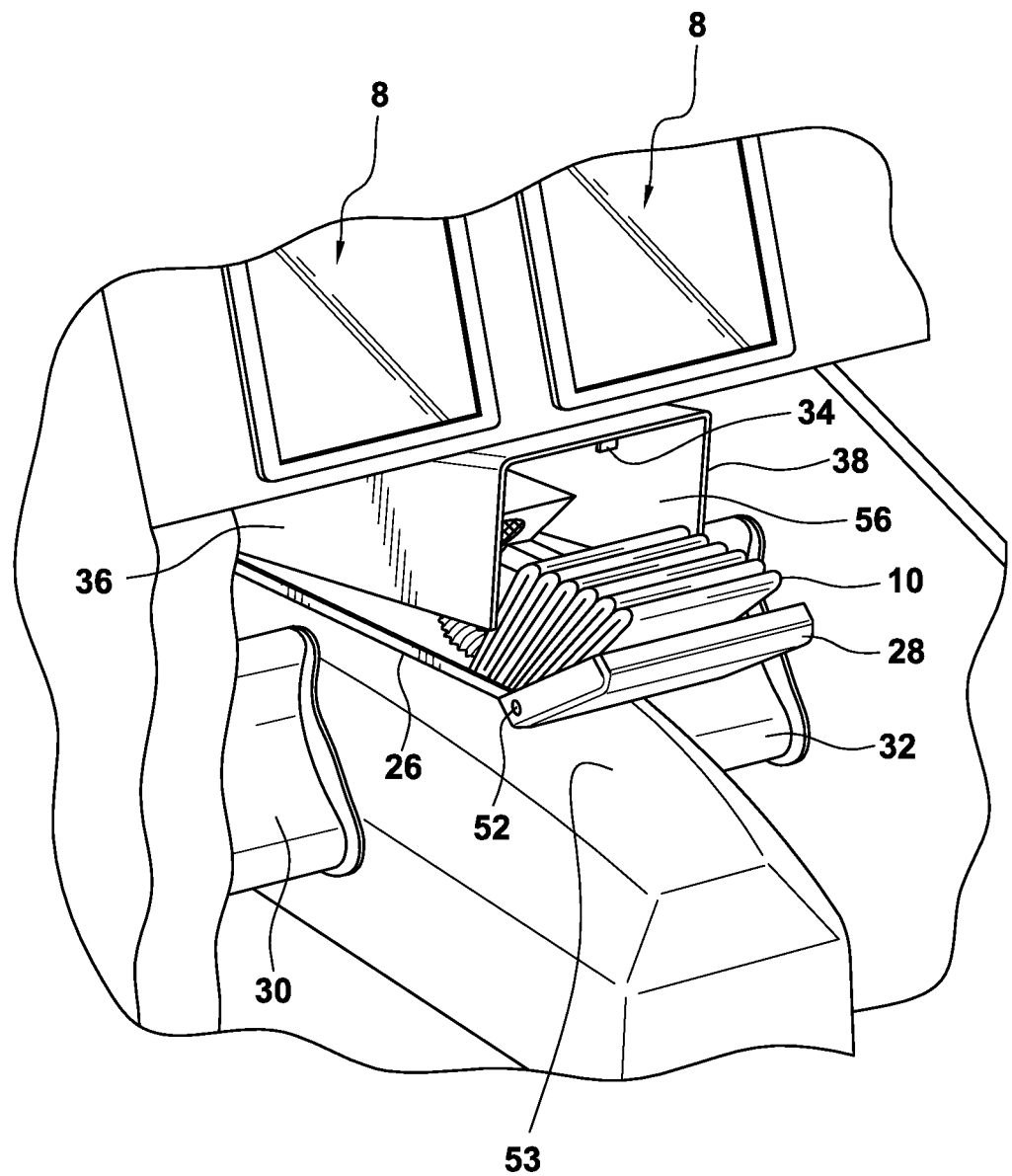
FIG. 5 is a perspective view of the housing shown in an open position, prior to deployment of the apparatus in an emergency situation.

Referring to FIG. 5, opening the front cover 28 preferably also opens the bottom cover 26, presenting the folded enclosure 10 to the user. The covers 26 and 28 in the open positions advantageously provides a larger opening to the housing 20 for retrieval of the enclosure 10. The forward part of the folded enclosure 10 is immediately visible in the opening 56 to the user 16 for handling in the deployment. After the enclosure 10 is deflated, the larger opening 56 advantageously allows the user to push the enclosure 10 back into the housing 20 as the enclosure is being deflated to get it out of the way of the user.

It is seen from the foregoing description that the apparatus 2 is stored in a convenient location for quick deployment when needed to enable an operator to maintain visual contact with instruments or other visual sources of data after vision-obscuring matter, such as smoke and/or particulate matter from a fire, has invaded the operator's environment. In particular, the apparatus 2 when deployed provides a clear view outside the windshield and of the instrument panel in an aircraft cockpit, thereby providing the pilot with vital information for guiding the aircraft to a safe landing after such as smoke or other vision-obscuring matter, invades the cockpit area.

Although the apparatus 2 is shown in the context of an aircraft cockpit, the invention can be used in other similar environments where an operator in a station requires access to information from a source, such as an instrument panel, during a vision-obscuring emergency, such as a smoke generating event. Examples of operator stations are a submarine control station, a nuclear power plant control room, an oil rig or any other critical or military environments where the need exists for an operator to continue to operate in case of a vision-obscuring emergency, such as when smoke or other particulate matter invades the operator station and obliterates the visibility between the operator and the control panel. Accordingly, where the instruments, control panel or critical sources of information are disposed in an operator station, the operator must have visual access to the information in case a vision-obscuring event occurs in the operator station.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. An emergency vision apparatus, comprising:
   a) a housing for attachment underneath an instrument panel in a cockpit, the housing including a front opening, a front cover for the front opening, a bottom portion of the front cover being pivotably attached to the housing to allow the front cover to open and rotate downwardly;
   b) a blower within the housing;
   c) an inflatable enclosure made of airtight material and having an expanded form when deployed and a deflated form when not in use, the enclosure when in the deflated form is stored within the housing;

d) first and second clear members disposed at respective first and second ends of the enclosure to enable a user to see through the enclosure when expanded and observe a visual source of information at a distal end of the enclosure while smoke or other particulate matter is in the environment;

e) a first switch operably associated with the blower to activate the blower and thereby inflate the enclosure to the expanded form when the enclosure is to be deployed; and f) a tubular air passageway connecting the blower and the enclosure.

2. The emergency vision apparatus as in claim 1, wherein the housing includes a length and a width and the length is longer that the width.

3. The emergency vision apparatus as in claim 1, wherein the housing is box-shaped.

4. The emergency vision apparatus as in claim 1, wherein the switch is activated when the enclosure in the deflated form is pulled out from the housing.

5. The emergency vision apparatus as in claim 1, and further comprising a second switch to reverse the blower to deflate the enclosure after inflation.

6. The emergency vision apparatus as in claim 1, wherein:
a) a latch is operably associated with the front cover; and
b) the latch is operative to open the front cover.

7. The emergency vision apparatus as in claim 1, wherein:
a) the housing includes a bottom opening; and
b) a bottom cover for the bottom opening.

8. The emergency vision apparatus as in claim 7, wherein the bottom cover is pivotably attached at a rear portion of the housing.

9. The emergency vision apparatus as in claim 7, wherein:
a) a latch is operably associated with the front cover; and
b) the latch is operative to open the bottom cover.

10. The emergency vision apparatus as in claim 8, wherein the bottom cover has a limited range of motion when opened.

11. The emergency vision apparatus as in claim 7, wherein the front cover is pivotably attached to a front portion of the bottom cover.

12. The emergency vision apparatus as in claim 10, wherein the front cover has a limited range of motion when opened.

13. The emergency vision apparatus as in claim 1, wherein the enclosure inside the housing pushes against the front cover.

14. The emergency vision apparatus as in claim 1, wherein the blower is disposed on the bottom cover.

15. The emergency vision apparatus as in claim 7, wherein the housing includes a top wall, left- and right-side walls attached to the top wall, a back wall attached to the top wall and the left-side wall and the right-side wall.

16. The emergency vision apparatus as in claim 1, wherein the enclosure in the deflated form is disposed toward the front cover.

17. The emergency vision apparatus as in claim 9, wherein a front portion of the enclosure in the deflated form is visible to the user when the bottom cover is opened.

18. The emergency vision apparatus as in claim 1, wherein the blower is disposed at a rear portion of the housing.

19. The emergency vision apparatus as in claim 1, wherein:
a) a removable member is operably associated with the switch such that removal of the member away from the switch is effective to turn on the switch; and
b) the member is attached to the hose.

20. The emergency vision apparatus as in claim 1, wherein the enclosure in the deflated form is disposed on the bottom cover.

21. An emergency vision apparatus, comprising:
a) a housing for attachment underneath an instrument panel in a cockpit, the housing including a bottom opening and a front opening, a bottom cover for the bottom opening, a front cover for the front opening, a rear portion of the bottom cover being pivotably attached to the housing to allow the bottom cover to open and rotate downwardly;
b) a blower within the housing;
c) an inflatable enclosure made of airtight material and having an expanded form when deployed and a deflated form when not in use, the enclosure when in the deflated form is stored within the housing;
d) first and second clear members disposed at respective first and second ends of the enclosure to enable a user to see through the enclosure when expanded and observe a visual source of information at a distal end of the enclosure while smoke or other particulate matter is in the environment;
e) a first switch operably associated with the blower to activate the blower and thereby inflate the enclosure to the expanded form when the enclosure is to be deployed; and
f) a tubular air passageway connecting the blower and the enclosure.

22. The emergency vision apparatus as in claim 21, wherein a bottom portion of the front cover is pivotably attached to bottom cover to allow the front cover to open and rotate downwardly.

* * * * *